US008218192B2

(12) United States Patent
Kamei

(10) Patent No.: US 8,218,192 B2
(45) Date of Patent: Jul. 10, 2012

(54) PRINTING PROCESS SYSTEM, A PRINTING CONTROL APPARATUS, A TERMINAL APPARATUS, AND PRINTING PROCESS METHOD

(75) Inventor: Tasuku Kamei, Hachioji (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 354 days.

(21) Appl. No.: 12/711,460

(22) Filed: Feb. 24, 2010

(65) Prior Publication Data

US 2010/0220361 A1 Sep. 2, 2010

(30) Foreign Application Priority Data

Feb. 27, 2009 (JP) ................................. 2009-046722

(51) Int. Cl.
*G06K 15/00* (2006.01)
(52) U.S. Cl. ...................... 358/1.18; 358/1.11; 358/1.12; 358/1.13; 358/1.15; 358/2.1; 709/201; 270/37; 270/45
(58) Field of Classification Search ................ 358/1.11, 358/1.12, 1.13, 1.15, 1.18, 1.4, 2.1; 709/201; 270/37, 45
See application file for complete search history.

(56) References Cited

U.S. PATENT DOCUMENTS

| 2003/0090707 | A1* | 5/2003 | Simpson et al. | 358/1.15 |
| 2005/0259287 | A1* | 11/2005 | Watanabe | 358/1.12 |
| 2007/0002376 | A1* | 1/2007 | Kurohata et al. | 358/1.18 |
| 2007/0229881 | A1 | 10/2007 | Matsubara et al. | |
| 2007/0229883 | A1 | 10/2007 | Fujimori et al. | |
| 2008/0049242 | A1* | 2/2008 | Kimura | 358/1.12 |
| 2009/0122348 | A1* | 5/2009 | Sato | 358/1.18 |
| 2009/0127843 | A1* | 5/2009 | Kanzawa | 281/38 |
| 2009/0147290 | A1* | 6/2009 | Tomita | 358/1.9 |

FOREIGN PATENT DOCUMENTS

| JP | 2006-251962 | | 9/2006 |
| JP | 2006-263970 | A | 10/2006 |
| JP | 2008-165732 | | 7/2008 |

OTHER PUBLICATIONS

Office Action (Notification of Reason for Refusal) dated Feb. 1, 2011, issued in the corresponding Japanese Patent Application No. 2009-046722, and an English Translation thereof.

* cited by examiner

*Primary Examiner* — King Poon
*Assistant Examiner* — Allen H Nguyen
(74) *Attorney, Agent, or Firm* — Buchanan Ingersoll & Rooney PC

(57) ABSTRACT

The printing process system for laying out and printing images for two pages on one side of each sheet for creating a booklet, comprises: a generating unit for generating, in order to cause a plurality of printing devices to print the images on the sheets to form a booklet, print sheet data and insertion sheet data intended for each of the printing devices; a calculating unit for calculating a shift amount of the image for each of the sheets referenced in the print sheet data based on the print sheet data and the insertion sheet data, the shift amount ensuring that the image gets closer to the center of the sheet as the sheet gets closer to the innermost of the booklet; and an instructing unit for instructing a relevant printing device to print the images on the sheets referenced in the print sheet data, based on the shift amount.

17 Claims, 12 Drawing Sheets

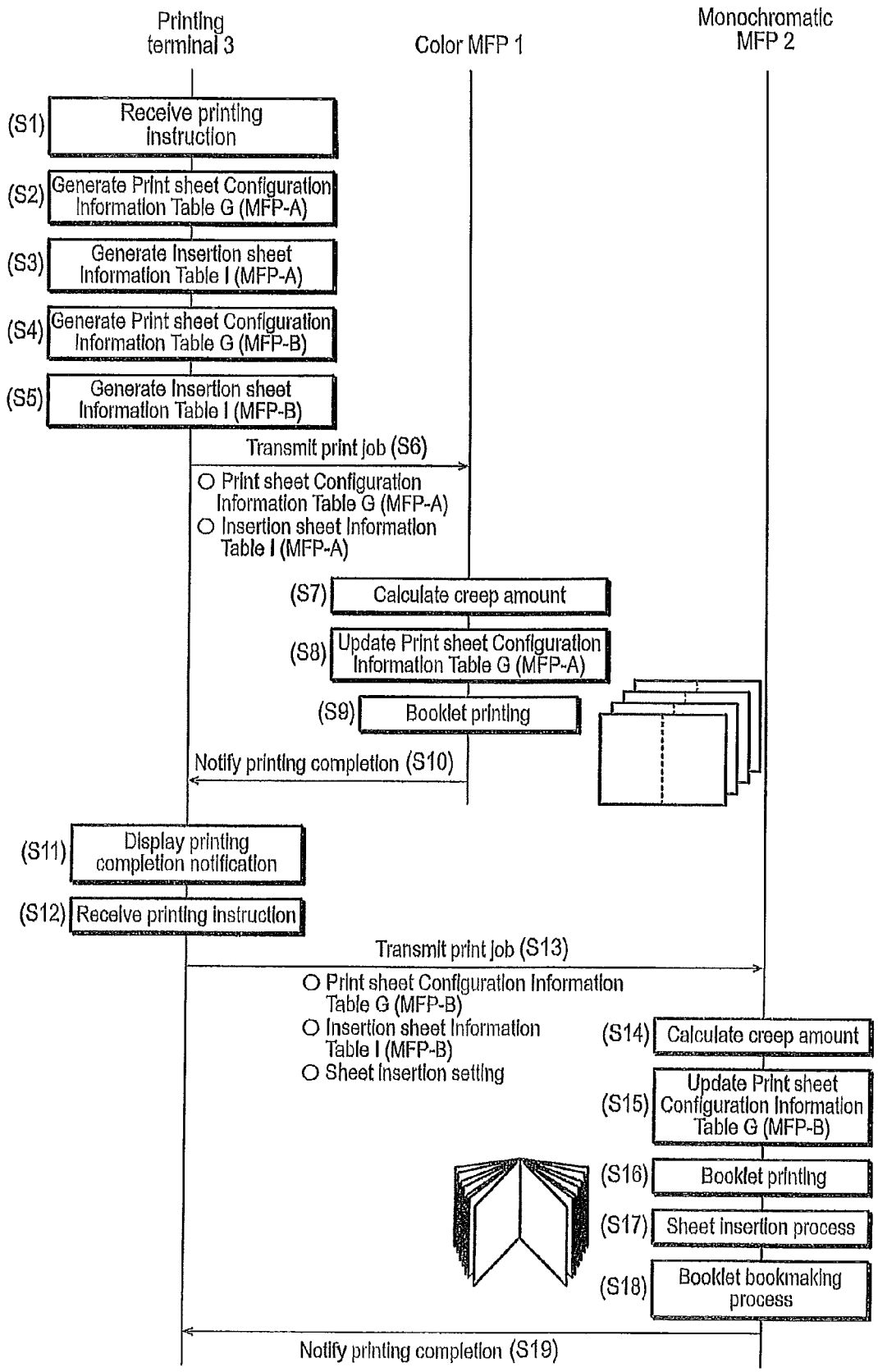

Print sheet Configuration Information Table G (MFP-A)

| Index | SheetNo | Paper Weight | Paper type | Creep amount |
|---|---|---|---|---|
| 1 | 2 | 61 | Plain paper | |
| 2 | 12 | 61 | Plain paper | |
| 3 | 14 | 92 | Coated paper | |
| 4 | 15 | 61 | Plain paper | |

Insertion sheet Information Table I (MFP-A)

| Index | SheetNo | Paper Weight | Paper type |
|---|---|---|---|
| 1 | 1 | 61 | Plain paper |
| 2 | 3 | 61 | Plain paper |
| 3 | 4 | 92 | Coated paper |
| 4 | 5 | 61 | Plain paper |
| 5 | 6 | 61 | Plain paper |
| 6 | 7 | 61 | Plain paper |
| 7 | 8 | 61 | Plain paper |
| 8 | 9 | 61 | Plain paper |
| 9 | 10 | 61 | Plain paper |
| 10 | 11 | 61 | Plain paper |
| 11 | 13 | 190 | Heavy paper |

(B)

Print sheet Configuration Information Table G (MFP-B)

| Index | SheetNo | Paper Weight | Paper type | Creep amount |
|---|---|---|---|---|
| 1 | 1 | 61 | Plain paper | |
| 2 | 3 | 61 | Plain paper | |
| 3 | 4 | 92 | Coated paper | |
| 4 | 5 | 61 | Plain paper | |
| 5 | 6 | 61 | Plain paper | |
| 6 | 7 | 61 | Plain paper | |
| 7 | 8 | 61 | Plain paper | |
| 8 | 9 | 61 | Plain paper | |
| 9 | 10 | 61 | Plain paper | |
| 10 | 11 | 61 | Plain paper | |
| 11 | 13 | 190 | Heavy paper | |

Insertion sheet Information Table I (MFP-B)

| Index | SheetNo | Paper Weight | Paper type |
|---|---|---|---|
| 1 | 2 | 61 | Plain paper |
| 2 | 12 | 61 | Plain paper |
| 3 | 14 | 92 | Coated paper |
| 4 | 15 | 61 | Plain paper |

Print sheet Configuration Information Table G (MFP-A)

| Index | SheetNo | Paper Weight | Paper type | Creep amount |
|---|---|---|---|---|
| 1 | 2 | 61 | Plain paper | 0.13mm |
| 2 | 12 | 61 | Plain paper | 1.56mm |
| 3 | 14 | 92 | Coated paper | 2.82mm |
| 4 | 15 | 61 | Plain paper | 2.94mm |

(B)

Print sheet Configuration Information Table G (MFP-B)

| Index | SheetNo | Paper Weight | Paper type | Creep amount |
|---|---|---|---|---|
| 1 | 1 | 61 | Plain paper | 0mm |
| 2 | 3 | 61 | Plain paper | 0.26mm |
| 3 | 4 | 92 | Coated paper | 0.60mm |
| 4 | 5 | 61 | Plain paper | 0.72mm |
| 5 | 6 | 61 | Plain paper | 0.84mm |
| 6 | 7 | 61 | Plain paper | 0.96mm |
| 7 | 8 | 61 | Plain paper | 1.08mm |
| 8 | 9 | 61 | Plain paper | 1.20mm |
| 9 | 10 | 61 | Plain paper | 1.32mm |
| 10 | 11 | 61 | Plain paper | 1.44mm |
| 11 | 13 | 190 | Heavy paper | 2.48mm |

Color information per sheet (SPC)

| SheetNo | Color mode | Initial value |
|---|---|---|
| 1 | Monochromatic | Monochromatic |
| 2 | Color | Monochromatic |
| 3 | Color | Monochromatic |
| 4 | Color | Monochromatic |

(B)

Color information per page (PPC)

| PageNo | Color mode |
|---|---|
| 1 | Monochromatic |
| 2 | Monochromatic |
| 3 | Monochromatic |
| 4 | Monochromatic |
| 5 | Color |
| 6 | Color |
| 7 | Color |
| 8 | Monochromatic |
| 9 | Color |
| 10 | Monochromatic |
| 11 | Color |
| 12 | Monochromatic |
| 13 | Color |
| 14 | Color |
| 15 | Monochromatic |
| 16 | Monochromatic |

PRINTING PROCESS SYSTEM, A PRINTING CONTROL APPARATUS, A TERMINAL APPARATUS, AND PRINTING PROCESS METHOD

CROSS-REFERENCE TO RELATED APPLICATION

This application is based on Japanese Patent Application No. 2009-046722, filed on Feb. 27, 2009, the contents of which are incorporated herein by reference.

BACKGROUND

1. Technical Field

The present invention relates to a printing process system, a printing control apparatus, a terminal apparatus, and a printing process method. The present invention particularly relates to a printing process system, a printing control apparatus, a terminal apparatus, and a printing process method for executing booklet printing using a plurality of printing devices.

2. Description of Related Art

The cluster printing process has been known as a means of executing a print job by distributing it among a plurality of printers connected to a network. The cluster printing process can improve productivity by means of uniformly distributing the load among a plurality of printers or distributing monochromatic/color printing process among monochromatic printers and color printers.

On the other hand, a booklet printing (Weekly Magazine Bound Printing) has been known as a part of printer functions in which images for two page are laid out and printed on one side of a sheet of paper so that a pile of sheets can be stitched in the middle to form a booklet. In the booklet printing, a technology of adjusting the shift amount (creep amount) of the position of the image printed on the sheet from the reference position based on the paper type and paper weight so that the image can be shifted toward the center from the edge of the sheet as the printing advances from the sheets on the outside towards the sheets on the inside of the booklet, has been suggested from the standpoint of improving the appearance of the booklet (refer to Unexamined Japanese Patent Publication No. 2006-263970). Such a technology can contribute to maintaining the distance of the image printed on each page from the end side constant for all pages of a booklet after trimming.

However, it has a problem of resulting in a booklet with poor appearance because of inadequate adjustments of shift amounts among a plurality of printers when the booklet printing for forming a booklet is executed by the cluster printing process mentioned above.

SUMMARY

The present invention is intended to solve the above-mentioned problem. Consequently, the object of the present invention is to provide a printing process system, a printing control apparatus, a terminal apparatus, and a printing process method for realizing booklet printing capable of creating a booklet with good appearance using a plurality of printing devices.

To achieve at least one of the above-mentioned objects, a printing process system reflecting one aspect of the present invention for laying out and printing images for every two pages on one side of each sheet of paper for the purpose of creating a booklet of a pile of sheets stitched in the middle, comprises: a generating unit for generating, in order to cause a plurality of printing devices to print the images on the sheets to form a booklet, print sheet data and insertion sheet data intended for each of the printing devices, the print sheet data showing information concerning the sheets for printing images using one of the printing devices, the insertion sheet data showing information concerning the sheets for printing images using the rest of the printing devices; a calculating unit for calculating a shift amount for shifting the position of the image relative to the sheet, from a reference position, for each of the sheets referenced in the print sheet data, based on the print sheet data and the insertion sheet data generated by the generating unit, the shift amount ensuring that the image gets away from the edge of the sheet to be closer to its center as the sheet gets away from the outermost of the booklet to be closer to its innermost; and an instructing unit for instructing a relevant printing device to print the images on the sheets referenced in the print sheet data, based on the shift amount calculated by the calculating unit.

It is preferable in the abovementioned printing process system that the print sheet data and the insertion sheet data include the sheet number that indicates the serial number of the particular sheet referenced in the relevant data according to the orders starting from the outermost sheet of the booklet, and the calculating unit calculates the shift amounts for the sheets referenced in the print sheet data, by calculating the shift amounts for all the sheets referenced in the print sheet data and the insertion sheet data sequentially according to the order starting from the smallest sheet number.

It is preferable that abovementioned printing process system further comprises: an acquiring unit for acquiring printing setting information in order to specify the sheets for printing images using each one of the printing devices, wherein the generating unit generates the print sheet data and the insertion sheet data intended for each of the printing devices, from the printing setting information acquired by the acquiring unit.

It is preferable in the abovementioned printing process system that the generating unit is provided on a terminal apparatus that generates a print job containing the print sheet data and the insertion sheet data, and the calculating unit and the instructing unit are provided on a printing control apparatus that executes the print job.

It is preferable in the abovementioned printing process system that the generating unit and the calculating unit are provided on a terminal apparatus that generates a print job containing the print sheet data with the shift amount added, and the instructing unit is provided on a printing control apparatus that executes the print job.

It is preferable in the abovementioned printing process system that the printing devices include both a color printing device and a monochromatic printing device, the print sheet data generated for the color printing device shows information concerning the sheets for printing color images, and the print sheet data generated for the monochromatic printing device shows information concerning the sheets for printing monochromatic images alone.

The objects, features, and characteristics of this invention other than those set forth above will become apparent from the description given herein below with reference to preferred embodiments illustrated in the accompanying drawings.

BRIEF DESCRIPTION OF THE DRAWINGS

FIG. 7 is a sequence chart for describing the outline of the operation of the printing process system shown in FIG. 1.

FIG. 8 is a diagram showing print sheet configuration information tables and insertion sheet information tables.

FIG. 9 is a diagram showing print sheet configuration information tables with creep amounts added.

FIG. 14 is a diagram showing color information per sheet and color information per page.

DETAILED DESCRIPTION

The embodiment of this invention will be described below with reference to the accompanying drawings.

[First Embodiment]

Figure 1:
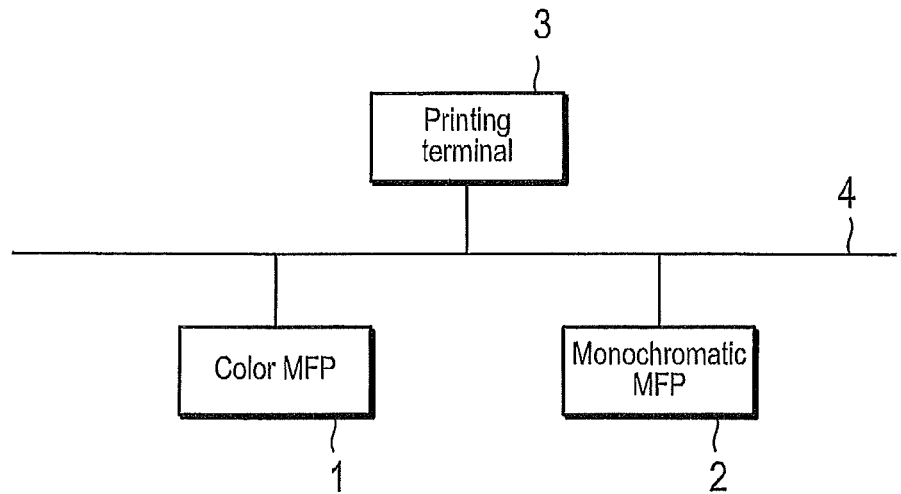
FIG. 1 is a block diagram showing the overall constitution of the printing process system according to the first embodiment of the present invention.

FIG. 1 is a block diagram showing the overall constitution of the printing process system according to the first embodiment of the present invention.

As shown in FIG. 1, the printing process system according to the present embodiment has a color MFP (Multi-Function Peripheral) 1, a monochromatic MFP 2, and a printing terminal 3. The color MFP 1, the monochromatic MFP 2, and the printing terminal 3 are interconnected via a network 4 so that they can communicate with each other.

The network 4 consists of various networks such as a LAN connecting computers and network equipment according to standards such as Ethernet, Token Ring, and FDDI, or a WAN that consists of several LANs connected by a dedicated line. The types and the number of equipment to be connected to the network 4 are not limited to those shown in FIG. 1.

Figure 2:
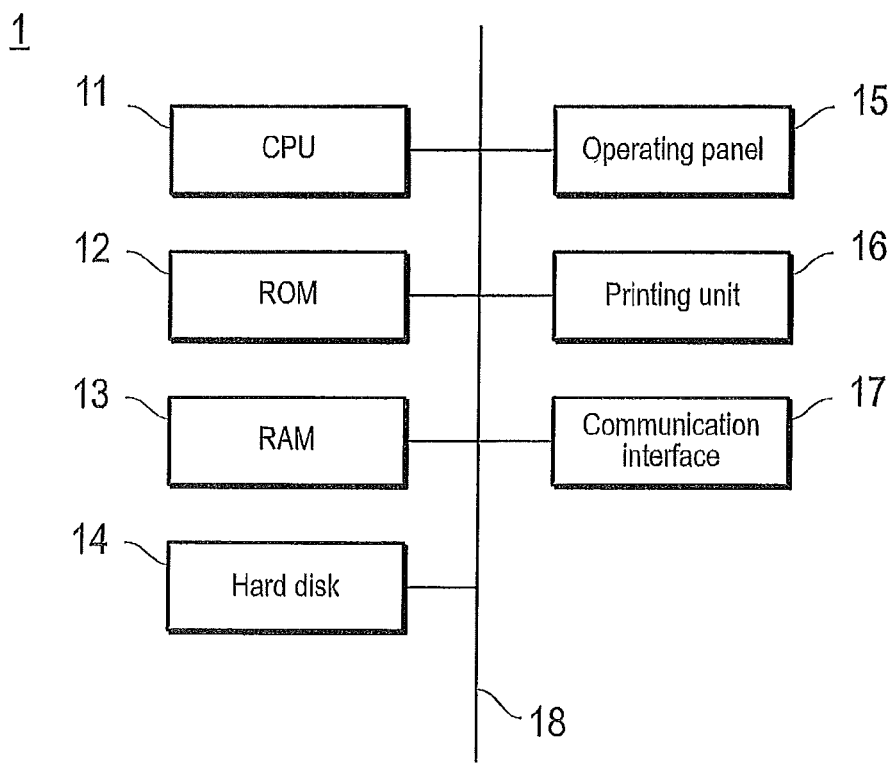
FIG. 2 is a block diagram showing the constitution of the color MFP shown in FIG. 1.

FIG. 2 is a block diagram showing the constitution of the color MFP shown in FIG. 1. The color MFP 1 has a CPU 11, a ROM 12, a RAM 13, a hard disk 14, an operating panel 15, a printing unit 16, and a communication interface 17, all of which are interconnected with each other via a bus 18 for exchanging signals.

The CPU 11 controls various parts indicated above and executes various arithmetic processes according to a program. The ROM 12 stores various programs and data. The RAM 13 stores programs and data temporarily as a working area. The hard disk 14 stores various programs including an operating system and various data.

The operating panel 15 is equipped with a touch panel, a ten-key pad, a start button, a stop button and others to be used for displaying various data and entering various instructions.

The printing unit 16 as a printing device prints various images based on various data on a recording medium such as paper using a known image forming process such as an electronic photography type process. The printing unit 16 is capable of forming color images using four color toners, i.e., cyan (C), magenta (M), yellow (y), and black (K). Moreover, the printing unit 16 prints images for two pages of the print document on one side of a sheet of paper based on image data for two pages assigned in the booklet printing.

The communication interface 17 is an interface for communicating with other equipment such as the printing terminal 3 via the network 4, for which various local connection interfaces, e.g., network interfaces such as Ethernet, Token Ring, and FDDI standards, serial interfaces such as USB and IEEE 1394, parallel interfaces such as SCSI, IEEE 1284, and wireless communication interfaces such as Bluetooth (registered trademark), IEEE 802.11, HomeRF, IrDA, as well as telephone circuit interfaces for connection to telephone circuits can be used.

Figure 3:
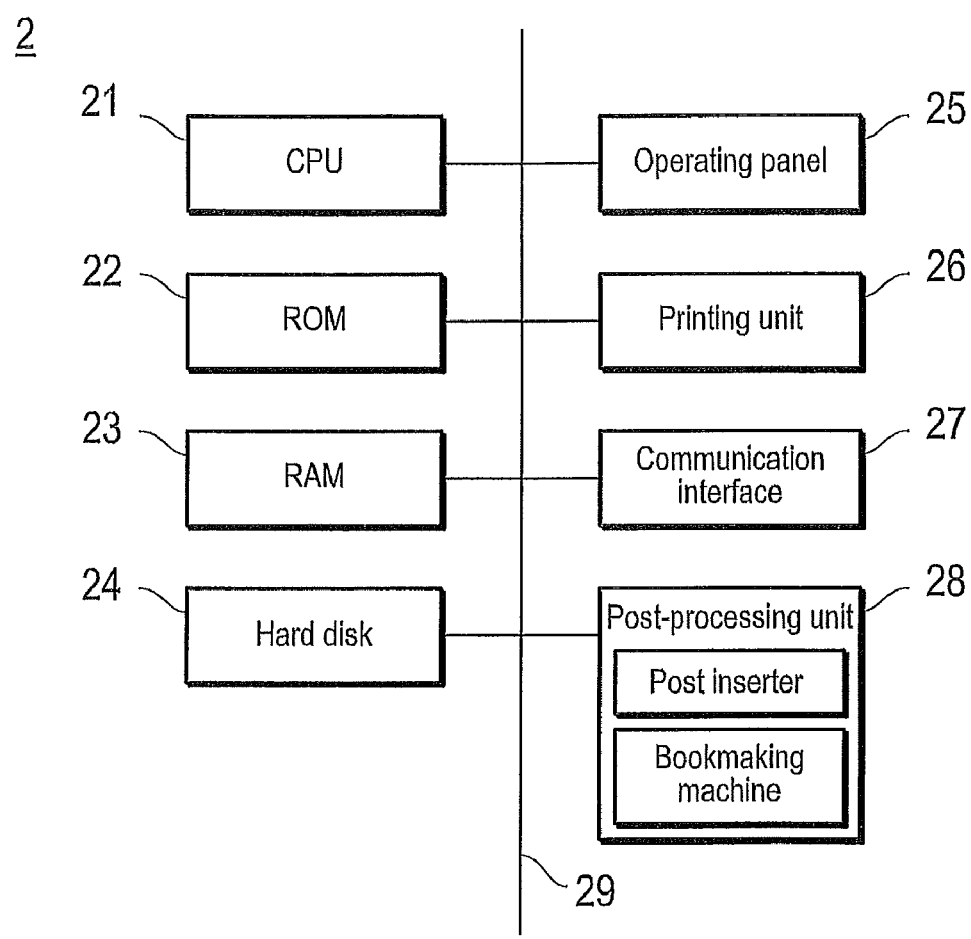
FIG. 3 is a block diagram showing the constitution of the monochromatic MFP shown in FIG. 1.

FIG. 3 is a block diagram showing the constitution of the monochromatic MFP shown in FIG. 1. The monochromatic MFP 2 has a CPU 21, a ROM 22, a RAM 23, a hard disk 24, an operating panel 25, printing unit 26, a communication interface 27, and a post-processing unit 28, all of which are interconnected with each other via a bus 29 for exchanging signals. The descriptions of those parts of the monochromatic MFP 2 that have the same functions as those of the corresponding parts of the color MFP 1 are omitted here to avoid being duplicative.

The printing unit 26 forms monochromatic images using only the black (K) toner. The post-processing unit 28 includes a post inserter and a bookmaking machine to execute the insertion process for inserting other sheets into printed sheets transferred from the printing unit 26 and the bookmaking process for stitching a pile of sheets in the middle into a booklet form.

Figure 4:
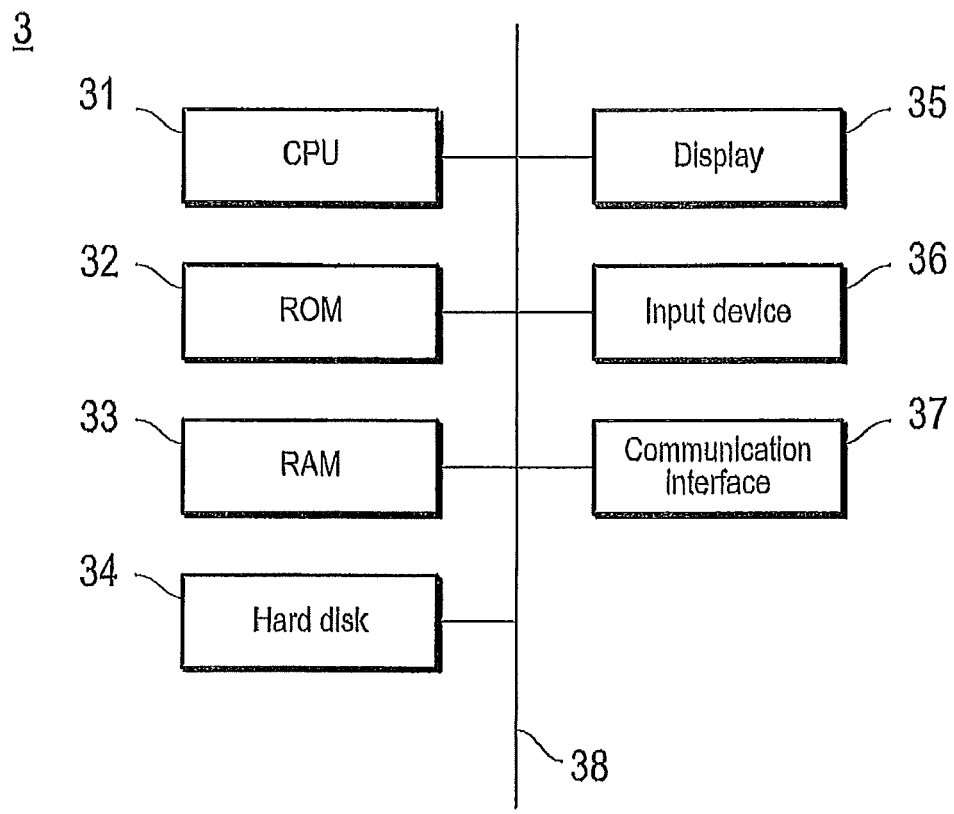
FIG. 4 is a block diagram showing the constitution of the printing terminal shown in FIG. 1.

FIG. 4 is a block diagram showing the constitution of the printing terminal shown in FIG. 1. The printing terminal 3 as a terminal apparatus includes a CPU 31, a ROM 32, a RAM 33, a hard disk 34, a display 35, an input device 36, and a communication interface 37, all of which are interconnected with each other via a bus 38 for exchanging signals. The descriptions of those parts of the printing terminal 3 that have the same functions as those of the corresponding parts of the color MFP 1 are omitted here to avoid being duplicative.

The display 35 is typically a CRT or a LCD and displays various kinds of information. The input device 36 consists of pointing devices such as a mouse, a keyboard, and others, and is used for making various kinds of inputs.

Figure 5:
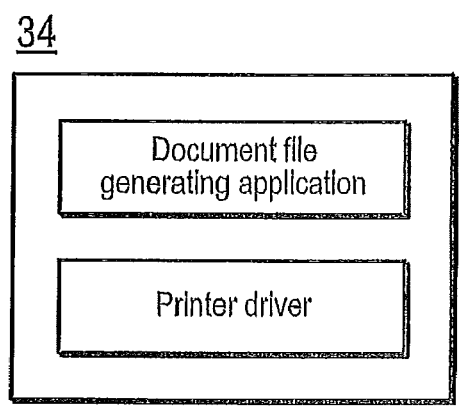
FIG. 5 is a block diagram showing the contents of the hard disk of the printing terminal shown in FIG. 4.

FIG. 5 is a block diagram showing the contents of the hard disk of the printing terminal shown in FIG. 4. A document file generating application for generating document files and a printer driver are installed on the hard disk 34 of the printing terminal 3. The printer driver generates printing data by converting a document file into PDL data described in PDL (Page Description Language). The printer driver sets up parameters concerning the printing condition based on the user's operation on the booklet printing setting screen to be described below, and generates for each of a plurality of MFPs a print sheet configuration information table showing information concerning the sheets on which images are printed by one of the MFPs and insertion sheet information table showing information concerning the sheets on which images are printed by the rest of the MFPs.

Figure 6:
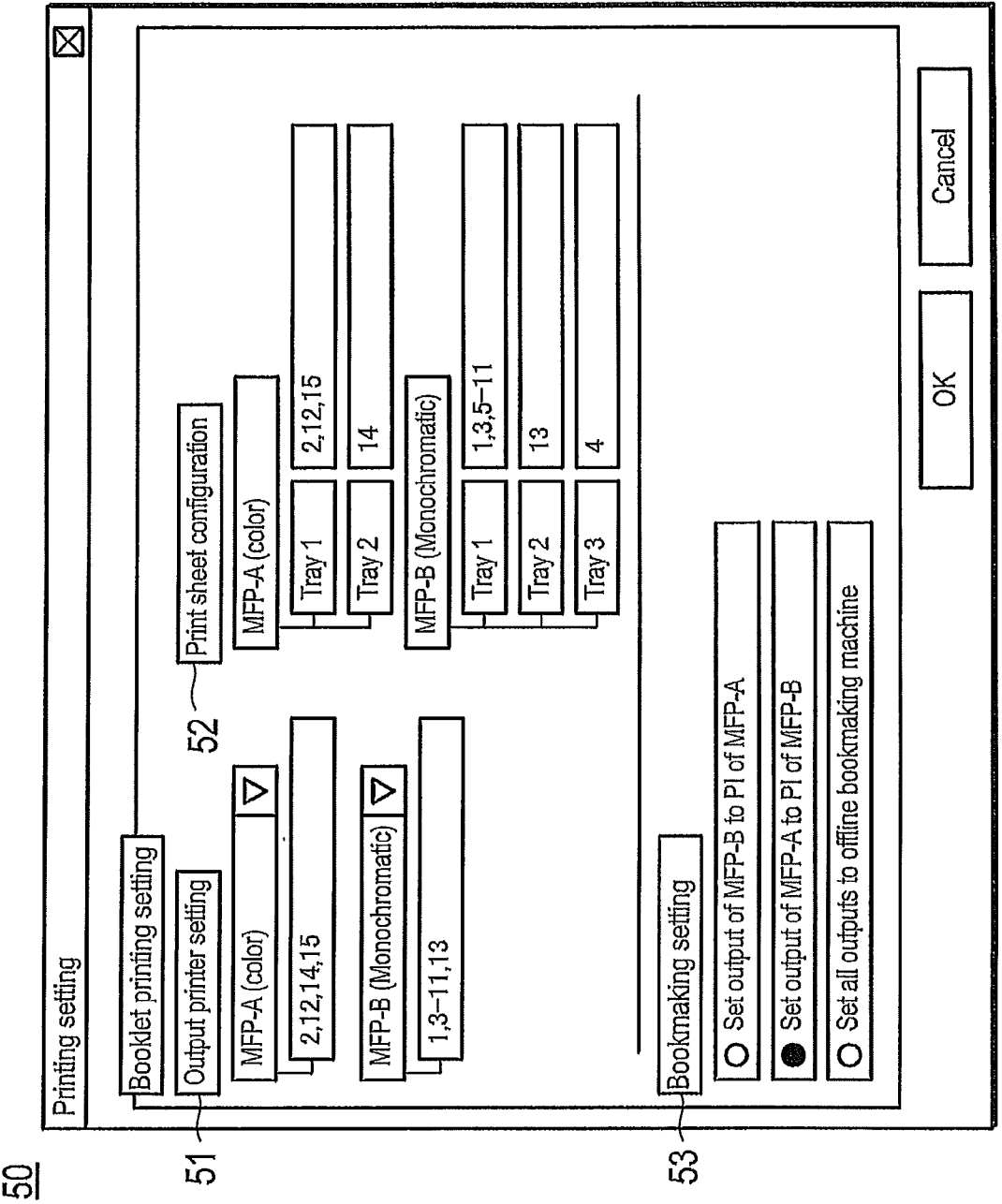
FIG. 6 is a diagram showing an example of a booklet printing setting screen provided by the printer driver.

FIG. 6 is a diagram showing an example of a booklet printing setting screen to be displayed on a display by the printer driver. The booklet printing setting screen 50 of the present embodiment is for setting up the printing condition per sheet, on one side of which images for two page are laid out (images for four pages on both sides) in booklet printing, and has an output printer setting part 51, a print sheet configuration part 52, and a bookmaking setting part 53.

The output printer setting part 51 is for receiving the assignment of MFP which prints images on the sheet, for each one of a plurality of sheets on which images for four page of the print document are laid out and printed. The output printer setting part 51 has a printer selection part for receiving the selection of MFPs and a sheet number input part for receiving the input of the sheet number of a sheet on which images are printed by each selected MFP, and receives the selection of a plurality of MFPs for sharing the task of executing the booklet printing and the assignments of the sheet numbers of the sheets on which the images will be printed by each of the MFPs. The sheet number here means a sequential number of each sheet numbered from the outside of a booklet for a bundle of sheets to be stacked to constitute the booklet.

In FIG. 6, a color MFP 1 and a monochromatic MFP 2 are selected as the MFPs for sharing the task of executing the booklet printing. Moreover, for the 15 sheets which constitute the booklet, the sheet numbers 2, 12, 14, and 15 indicating the 2nd, 12th, 14th, and 15th sheets are assigned as the sheet numbers of the sheet on which images are printed by the color MFP 1, while the sheet numbers 1, 3 through 11, and 13 indicating the 1st, 3rd through 11th, and 13th sheets are assigned as the sheet numbers of the sheet on which images are printed by the monochromatic MFP 2.

The print sheet configuration part 52 is for receiving the assignments of the supply trays which supply sheets. The print sheet configuration part 52 has a sheet number input part for receiving the input of sheet numbers for each of the supply trays of the two MFPs 1 and 2 which execute booklet printing, and receives the assignments of the sheet numbers of the sheets supplied by each supply tray. The list of supply trays that can supply sheet is displayed on the booklet printing setting screen 50 in response to the MFPs selected by the output printer setting part 51.

In FIG. 6, for the 15 sheets which constitute the booklet, the sheet numbers 2, 12, and 15 indicating the 2nd, 12th, and 15th sheets are assigned as the sheet numbers of the sheet supplied by the first sheet supply tray of the color MFP 1, while the sheet number 14 indicating the 14th sheet is assigned as the sheet number of the sheet supplied by the second sheet supply tray of the color MFP 1. Moreover, the sheet numbers 1, 3, and 5 through 11 indicating the 1st, 3rd, and 5th through 11th sheets are assigned as the sheet numbers of the sheet supplied by the first sheet supply tray of the monochromatic MFP 2, while the sheet numbers 13 and 4 indicating the 13th and 4th sheets are assigned as the sheet numbers of the sheet supplied by the second and third sheet supply trays of the monochromatic MFP 2 respectively.

The bookmaking setting part 53 is for receiving the setting of bookmaking process. The bookmaking setting part 53 receives a setting selected by the user from the three settings, i.e., "set the output of MFP-B to PI of MFP-A", "set the output of MFP-A to PI of MFP-B", and "set all outputs to off-line bookmaking machine".

In FIG. 6, two settings, i.e., "set the output of MFP-A to PI of MFP-B" and "set all outputs to off-line bookmaking machine" are shown as eligible to be selected based on the configuration of the printing process system shown in FIG. 1, and "set the output of MFP-A to PI of MFP-B" is selected.

The color MFP 1, the monochromatic MFP 2, and the printer terminal 3 can each contain constituents other than those described above, or may lack a portion of the above-mentioned constituents.

Next, the outline of the operation of the printing process system of the present embodiment will be described below with reference to the sequence chart shown in FIG. 7.

FIG. 7 shows a case of a booklet printing process for forming a booklet, wherein the color MFP 1 executes a printing process for the sheets on which pages including color images are laid out, while the monochromatic MFP 2 executes another printing process for the remaining sheets.

First, the printing terminal 3 receives the printing instruction from the user (S1). The user instruct the execution of booklet printing after setting up the printing condition for a booklet printing using the booklet printing setting screen 50 shown in FIG. 6. As described above, the printing condition for the booklet printing is set up per sheet on both sides of which images for four pages are laid out so that a booklet can be made by folding a bundle of stacked sheets in the middle. In the present embodiment, it is set up in such a way that the printing process for sheets, on which pages including color images of a print document will be laid out, will be executed by the color MFP 1.

Upon receiving the printing instruction from the user, the printing terminal 3 generates the print sheet configuration information table G (MFP-A) that shows information concerning sheets on which images will be printed by the color MFP 1, and the insertion sheet information table I (MFP-A) that shows the information concerning sheets on which images will be printed by MFPs other than the color MFP 1, based on the printing setting information set up on the booklet printing setting screen 50 (S2, S3).

Next, the printing terminal 3 generates the print sheet configuration information table G (MFP-B) that shows information concerning sheets on which images will be printed by the monochromatic MFP 2, and the insertion sheet information table I (MFP-B) that shows the information concerning sheets on which images will be printed by MFPs other than the monochromatic MFP 2, based on the printing setting information set up on the booklet printing setting screen 50 (S4, S5).

FIG. 8 is a diagram showing print sheet configuration information tables and insertion sheet information tables. FIG. 8(A) is a diagram showing a print sheet configuration information table and an insertion sheet information table generated for a color MFP, and FIG. 8(B) is a diagram showing a print sheet configuration information table and an insertion sheet information table generated for a monochromatic MFP.

The print sheet configuration information tables G (MFP-A) and G (MFP-B) show the information concerning the sheets on which images are printed by MFPs 1 and 2 respectively, and contain items such as index number (index), sheet number (SheetNo), paper weight, paper type, and creep amount. The insertion sheet information tables I (MFP-A) and I (MFP-B) show the information concerning the sheets on which no image is printed by MFPs 1 and 2 respectively, and contain items such as index number (index), sheet number (SheetNo), paper weight, and paper type.

The index numbers are numbers for identifying sheets indicated in each Tables G and I, and the sheet numbers are numbers for indicating the serial numbers for each sheet indicated in each Tables G and I, counted from the outermost of the booklet, in the bundle of sheets that are stacked to form the booklet. The paper weight represents the weight per square meter of each sheet indicated in each table G and I, and the paper type represents the type of each sheet. The paper weight and paper type are set up for each sheet depending on the supply tray selected on the booklet printing setting screen 50. The creep amount is an item set up only for the print sheet configuration information tables G (MFP-A) and G (MFP-B)

and represents the shift amount of the position of the images for two pages that are laid out on one side of a sheet in the booklet printing, from a reference position. No value is set up in the cells of the creep amount on the print sheet configuration information tables G (MFP-A) and G (MFP-B) immediately after they are generated by the printing terminal 3. The print sheet configuration information tables G (MFP-A) and G (MFP-B) and the insertion sheet information tables I (MFP-A) and I (MFP-B) are stored temporarily in the RAM 33 of the printing terminal 3.

Next, the printing terminal 3 transmits the print job to the color MFP 1 (S6). At this time, the print sheet configuration information table G (MFP-A) and the insertion sheet information table I (MFP-A) generated for the color MFP 1 are transmitted to the color MFP 1 together with the printing data for the images to be printed by the color MFP 1.

Upon receiving the print job, the color MFP 1 calculates the creep amount that corresponds to the sheet indicated in the print sheet configuration information table G (MFP-A) (S7). In the present embodiment, the creep amount is calculated for each sheet indicated in the print sheet configuration information table G (MFP-A) based on both the print sheet configuration information table G (MFP-A) and the insertion sheet information table I (MFP-A) in such a way that appropriate creep amounts are set up between the two MFPs 1 and 2 that share the task of executing the booklet printing. The creep amount calculation process will be described later.

The print sheet configuration information table G (MFP-A) is updated based on the calculated creep amount (S8).

FIG. 9(A) is a diagram showing an updated print sheet configuration information table. As shown in FIG. 9(A), numerical values are set up in the cells of the creep amount on the updated print sheet configuration information table G (MFP-A). As described above, the creep amount is calculated using the information of all the sheets indicated in the print sheet configuration information table G (MFP-A) and the insertion sheet information table I (MFP-A) in such a way that it is properly set up between the two MFPs 1 and 2 that share the task of executing the booklet printing.

Next, the color MFP 1 executes the booklet printing based on the assignment of the creep amount (S9). More specifically, image data of the bitmap format is generated by RIP processing the PDL data. Next, the bitmap format image data is transferred to the printing unit 16 together with the print sheet configuration information table G (MFP-A). The printing unit 16 prints the image based on the image data on the specified sheet after laying out the image data in accordance with the instruction of the creep amount added to the print sheet configuration information table G (MFP-A).

The color MFP 1 on which the printing process is completed transmits the printing completion notification to the printing terminal 3 (S10). Upon receiving the printing completion notification, the printing terminal 3 displays on the display 35 a printing completion notification prompting the user to set the printed sheet output from the color MFP 1 to the post inserter of the monochromatic MFP 2 (S11). The user sets the printed sheets output from the color MFP 1 to the post inserter of the monochromatic MFP 2. The printing terminal 3 receives the instruction for restarting the booklet printing as the user presses the setting completion button (S12).

Upon receiving the instruction for restarting the booklet printing, the printing terminal 3 transmits the print job to the monochromatic MFP 2 (S13). At this time, the print sheet configuration information table G (MFP-B), the insertion sheet information table I (MFP-B), and the sheet insertion setting information are transmitted to the monochromatic MFP 2 together with the printing data for the images to be printed by the monochromatic MFP 2.

Upon receiving the print job, the monochromatic MFP 2 calculates the creep amount that corresponds to the sheet indicated in the print sheet configuration information table G (MFP-B) (S14). In the present embodiment, the creep amount is calculated for each sheet indicated in the print sheet configuration information table G (MFP-B) based on both the print sheet configuration information table G (MFP-B) and the insertion sheet information table I (MFP-B) in such a way that appropriate creep amounts are set up between the two MFPs 1 and 2 that share the task of executing the booklet printing.

The print sheet configuration information table G (MFP-B) is updated based on the calculated creep amount (S15).

FIG. 9(B) is a diagram showing an updated print sheet configuration information table. As shown in FIG. 9(B), numerical values are set up in the cells of the creep amount on the updated print sheet configuration information table G (MFP-B). As described above, the creep amount is calculated using the information of all the sheets indicated in the print sheet configuration information table G (MFP-B) and the insertion sheet information table I (MFP-B) in such a way that it is properly set up between the two MFPs 1 and 2 that share the task of executing the booklet printing.

Next, the monochromatic MFP 2 executes the booklet printing based on the assignment of the creep amount (S16). More specifically, image data of the bitmap format is generated by RIP processing the PDL data. Next, the bitmap format image data is transferred to the printing unit 26 together with the print sheet configuration information table G (MFP-B). The printing unit 26 prints the image based on the image data on the specified sheet after laying out the image data in accordance with the instruction of the creep amount added to the print sheet configuration information table G (MFP-B).

The sheets printed by the color MFP 1 are inserted between the printed sheets currently output from the monochromatic MFP 2 that has been executing printing process (S17). More specifically, the sheet, which was set into the post inserter of the monochromatic MFP 2 after being printed images by the color MFP 1, is inserted between the specified sheets based on the sheet insertion setting information. As a result, a plurality of sheets are stacked in the order of the sheet numbers to form a bundle of sheets.

The booklet making process is then executed (S18). More specifically, the bundle of sheets is folded in the middle and connected by stapling, etc. The edge is then cut off to complete a booklet. Upon completing the booklet making process, the monochromatic MFP 2 transmits the printing completion notification to the printing terminal 3 (S19), and the process is terminated.

As can be seen from the above, the booklet printing process for a plurality of sheets that constitute a booklet is executed by distributing the task among the two MFPs 1 and 2 in the printing process system of the present embodiment. In doing so, the creep amounts are calculated on MFPs 1 and 2 respectively based on both the print sheet configuration information table G and the insertion sheet information table I in such a way that the creep amounts are properly set up between the two MFPs 1 and 2. In other words, the creep amounts are calculated on the MFPs 1 and 2 using the information of all the sheets constituting a booklet in such a way that the creep amounts are properly set up between the two MFPs 1 and 2, that share the task of executing the booklet printing.

Next, the creep amounts calculation process on the MFPs of the present embodiment will be described in details with reference to FIG. 10.

Figure 10:
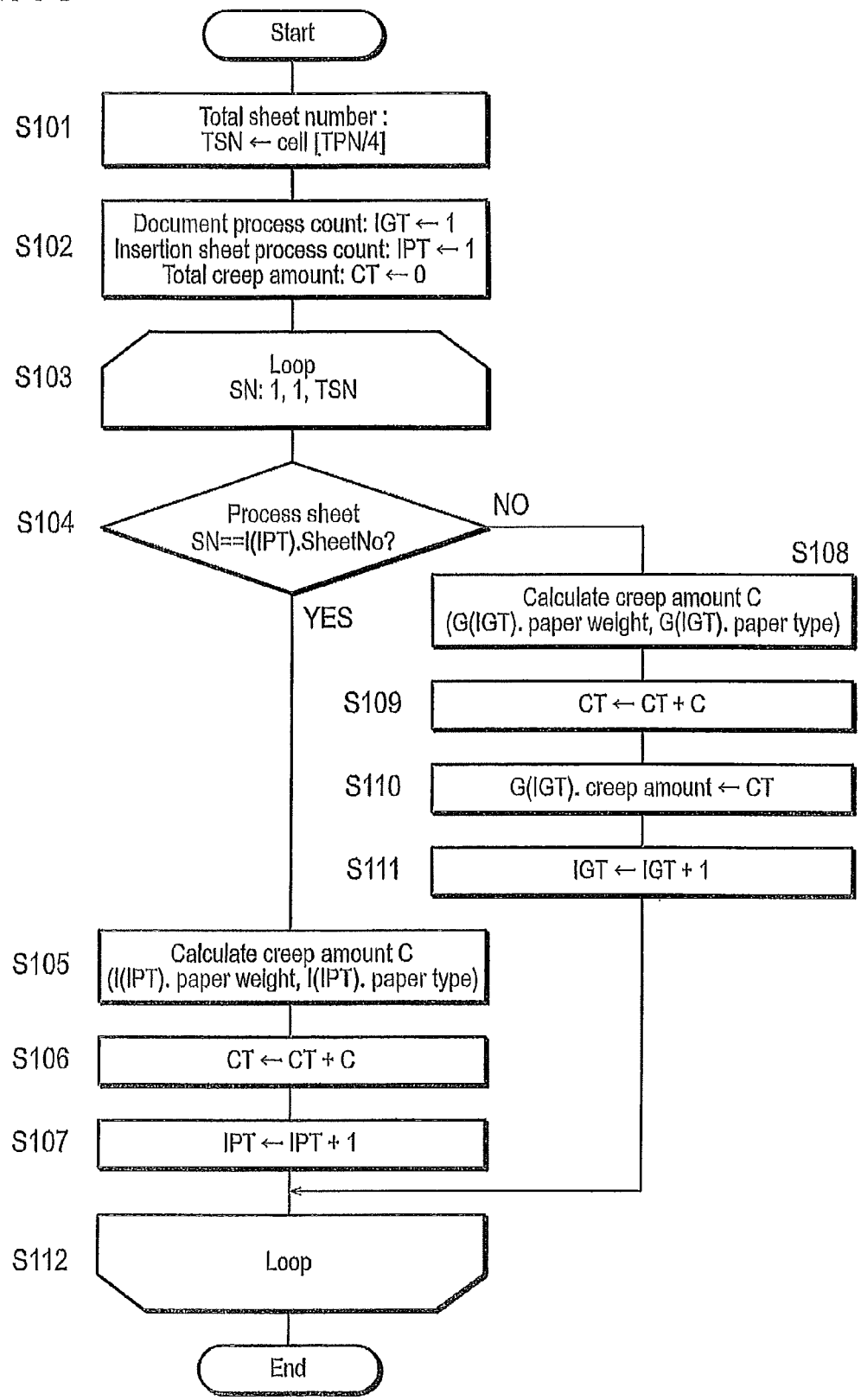
FIG. 10 is a flowchart for describing the process of calculating creep amounts by the color MFP shown in FIG. 1.

FIG. 10 is a flowchart for describing the process of calculating creep amounts by the color MFP shown in FIG. 1. The algorithm shown in the flowcharts of FIG. 10 is stored as a program in the ROM 12 of the color MFP 1 and executed by the CPU 11. The creep amount calculation process by the monochromatic MFP 2 is similar to the creep amount calculation process by the color MFP 1.

As shown in FIG. 10, in the creep amount calculation process of the present embodiment, first, the total sheet number TSN for the plurality of sheets to be stacked is calculated (S101). In the present embodiment, the total sheet number TSN is calculated by dividing the total number of pages of the print document by four and rounding up the value after the decimal point. Alternatively, the total sheet number TSN is calculated as a sum of the sheet number indicated in the print sheet configuration information table G (MFP-A) and the insertion sheet information table I (MFP-A).

Next, the document process count IGT, the insertion sheet process count IPT, and the total creep amount CT are set up to the initial values (step S102). In the present embodiment, the document process count IGT and the insertion sheet process count IPT that correspond to the index numbers of the print sheet configuration information table G (MFP-A) and the insertion sheet information table I (MFP-A) respectively are set up to their initial value "1", while the total creep amount CT is set up to the initial value "0".

Next, the program moves to the loop process to be executed for each sheet (step S103). In the present embodiment, the process shown in steps S104 through S112 are repeated incrementing the sheet number SN by 1 starting from the initial value of "1" until the number reaches the total sheet number TSN (e.g., 15).

In the loop process, first, a judgment is made as to whether the sheet of the current sheet number SN is an insertion sheet or not (step S104). In the present embodiment, the judgment as to whether the sheet of the current sheet number SN is an insertion sheet or not is made by first referring to the index number of the insertion sheet information table I (MFP-A) that matches with the current insertion sheet process count IPT and then making a judgment as to whether the sheet number that corresponds to the referred index number matches with the current sheet number SN.

If it is judged that the sheet of the current sheet number SN is an insertion sheet (step S104: Yes), the creep amount C of the sheet of the current sheet number SN is calculated based on the information indicated in the insertion sheet information table I (MFP-A) (step S105). In the present embodiment, the creep amount C is calculated by first referring to the index number of the insertion sheet information table I (MFP-A) that matches with the current insertion sheet process count IPT, and then calculating it based on the paper weight and the paper type that correspond to the referred index number. Since the process itself of calculating the creep amount based on the paper weight and the paper type of the sheet is a conventional creep amount calculation process, the detail description is omitted.

Next, the total creep amount CT is updated (step S106). In the present embodiment, the total creep amount CT is updated by adding the creep amount C calculated in the process shown in step S105 to the total creep amount CT prior to it.

Next, the insertion sheet process count IPT is updated (step S107). In the present embodiment, the insertion sheet process count IPT is updated by adding an increment of "1" to the insertion sheet process count IPT prior to it.

On the other hand, if it is judged that the sheet of the current sheet number SN is not an insertion sheet in step S104 (step S104: No), the creep amount C of the sheet of the current sheet number SN is calculated based on the print sheet configuration information table G (MFP-A) (step S108). In the present embodiment, the creep amount C is calculated by first referring to the index number of the print sheet configuration information table G (MFP-A) that matches with the current document process count IGT, and then calculating it based on the paper weight and the paper type that correspond to the referred index number.

Next, the total creep amount CT is updated (step S109). In the present embodiment, the total creep amount C is updated by adding the creep amount C calculated in the process shown in step S108 to the total creep amount CT prior to it.

The total creep amount CT is stored into the print sheet configuration information table G (MFP-A) (step S110). In the present embodiment, the total creep amount CT updated in the process shown in step S109 is set up as the creep amount that corresponds to the sheet of the index number that matches the current document process count IGT.

Next, the document process count IGT is updated (step S111). In the present embodiment, the document process count IGT is updated by adding an increment of "1" to the document process count IGT prior to it.

The creep amount is calculated for each sheet indicated in the print sheet configuration information table G (MFP-A), as the creep amount is sequentially calculated from the sheet with the smallest sheet number for all the sheets that constitute a booklet while the processes shown in steps S104 through S112 are repeated until the number reaches the total sheet number TSN.

As can be seen from the above, according to the creep amount calculation process shown in FIG. 10, the creep amount is calculated for each sheet indicated in the print sheet configuration information table G (MFP-A) generated for the color MFP 1, using the information of all the sheets that constitute a booklet. As a similar process is executed on the monochromatic MFP 2, the creep amount is calculated for each sheet indicated in the print sheet configuration information table G (MFP-B) generated for the monochromatic MFP 2, using the information of all the sheets that constitute the booklet.

Figure 11:
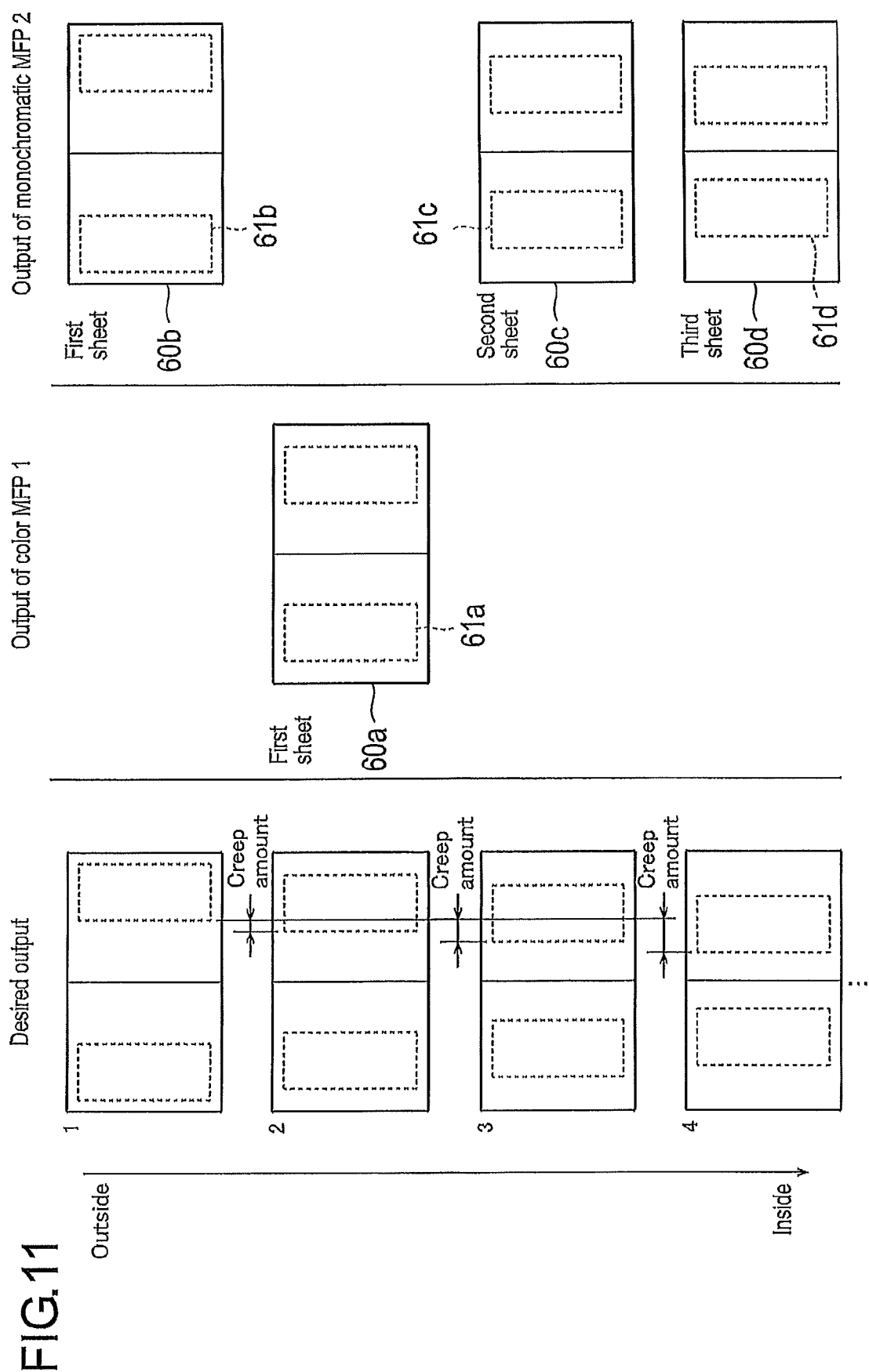
FIG. 11 is a diagram for describing the output results of the color MFP and the monochromatic MFP.

FIG. 11 is a diagram for describing the output results of the color MFP and the monochromatic MFP.

As shown in FIG. 11, in the printing process system of the present embodiment, the creep amount for the second sheet of a bundle of sheets that constitute a booklet is set up for the first sheet 60a to be printed out by the color MFP 1, for example, and a printing range 61a is shifted from the reference position according to the creep amount thus set up. On the other hand, the creep amounts for the first, third, and fourth sheet of the bundle of sheets that constitute the booklet are set up for the first through third sheets 60b, 60c, and 60d to be printed out by the monochromatic MFP 2, and the printing ranges 61b, 61c, and 61d are shifted from the reference position according to the creep amounts thus set up.

As can be seen from the above, creep amounts can be set up properly between the MFPs 1 and 2 that share the task of executing the booklet printing according to the printing process system of the present embodiment. Therefore, a booklet with good appearance can be made with the booklet printing using a plurality of MFPs 1 and 2.

Moreover, according to the printing process system of the present embodiment, the printing cost can be reduced as the monochromatic/color printing processes can be distributed appropriately among color MFPs and monochromatic MFPs.

[Second Embodiment]

Next, the second embodiment of the invention will be described below with reference to FIG. 12. The present embodiment is an embodiment in which the creep amount is calculated on the printing terminal.

Figure 12:
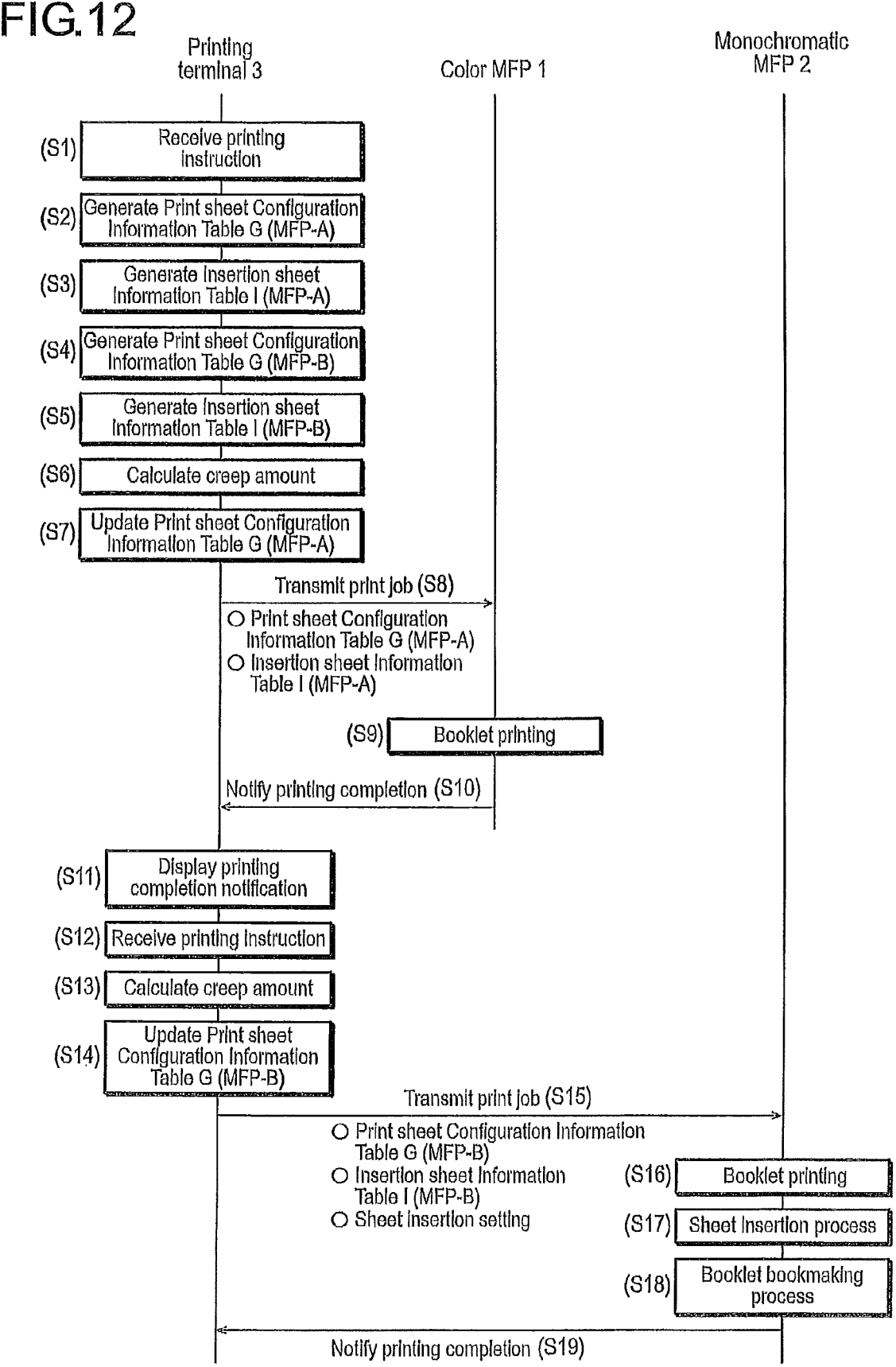
FIG. 12 is a sequence chart for describing the outline of the operation of the printing process system according to the second embodiment of the present invention.

FIG. 12 is a sequence chart for describing the outline of the operation of the printing process system according to the second embodiment of the present invention. Since the configuration of the printing process system in the present embodiment is the same as that of the printing process system in the first embodiment except that the creep amount calculation process is executed by the printing terminal 3, detailed descriptions are omitted.

As shown in FIG. 12, first, the printing terminal 3 receives the printing instruction from the user (S1). Upon receiving the printing instruction from the user, the printing terminal 3 generates the print sheet configuration information table G (MFP-A) that shows information concerning sheets on which images will be printed by the color MFP 1, and the insertion sheet information table I (MFP-A) that shows the information concerning sheets on which images will be printed by MFPs other than the color MFP 1, based on the printing setting information (S2, S3).

Next, the printing terminal 3 generates the print sheet configuration information table G (MFP-B) that shows information concerning sheets on which images will be printed by the monochromatic MFP 2, and the insertion sheet information table I (MFP-B) that shows the information concerning sheets on which images will be printed by MFPs other than the monochromatic MFP 2, based on the printing setting information (S4, S5).

The printing terminal 3 calculates the creep amount that corresponds to the sheet indicated in the print sheet configuration information table G (MFP-A) (S6). In the present embodiment, the creep amount is calculated for each sheet indicated in the print sheet configuration information table G (MFP-A) based on both the print sheet configuration information table G (MFP-A) and the insertion sheet information table I (MFP-A) in such a way that appropriate creep amounts are set up between the two MFPs 1 and 2 that share the task of executing the booklet printing. Moreover, in the present embodiment, the creep amount is calculated as the creep amount calculation process shown in FIG. 10 is executed by the printing terminal 3.

The print sheet configuration information table G (MFP-A) is updated based on the calculated creep amount (S7).

Next, the printing terminal 3 transmits the print job to the color MFP 1 (S8). At this time, the print sheet configuration information table G (MFP-A) and the insertion sheet information table I (MFP-A) are transmitted to the color MFP 1 together with the printing data for the images to be printed by the color MFP 1. Numerical values have been set up in the cells of the creep amount of the print sheet configuration information table G (MFP-A).

Upon receiving the print job, the color MFP 1 executes the booklet printing based on the assignment of the creep amount (S9). More specifically, image data of the bitmap format is generated by RIP processing the PDL data. Next, the bitmap format image data is transferred to the printing unit 16 together with the print sheet configuration information table G (MFP-A). The printing unit 16 prints the image based on the image data on the specified sheet after laying out the image data in accordance with the instruction of the creep amount added to the print sheet configuration information table G (MFP-A).

The color MFP 1 on which the printing process is completed transmits the printing completion notification to the printing terminal 3 (S10). Upon receiving the printing completion notification, the printing terminal 3 displays on the display 35 a printing completion notification prompting the user to set the printed sheet output from the color MFP 1 to the post inserter of the monochromatic MFP 2 (S11). The user sets the printed sheets output from the color MFP 1 to the post inserter of the monochromatic MFP 2. The printing terminal 3 receives the instruction for restarting the booklet printing as the user presses the setting completion button (S12).

Upon receiving the instruction for restarting the booklet printing, the printing terminal 3 calculates the creep amount that corresponds to the sheet indicated in the print sheet configuration information table G (MFP-B) (S13). In the present embodiment, the creep amount is calculated for each sheet indicated in the print sheet configuration information table G (MFP-B) based on both the print sheet configuration information table G (MFP-B) and the insertion sheet information table I (MFP-B) in such a way that appropriate creep amounts are set up between the two MFPs 1 and 2 that share the task of executing the booklet printing.

The print sheet configuration information table G (MFP-B) is updated based on the calculated creep amount (S14).

Next, the printing terminal 3 transmits the print job to the monochromatic MFP 2 (S15). At this time, the print sheet configuration information table G (MFP-B), the insertion sheet information table I (MFP-B), and the sheet insertion setting information are transmitted to the monochromatic MFP 2 together with the printing data for the images to be printed by the monochromatic MFP 2. Numerical values have been set up in the cells of the creep amount of the print sheet configuration information table G (MFP-B).

Upon receiving the print job, the monochromatic MFP 2 executes the booklet printing based on the assignment of the creep amount (S16). More specifically, image data of the bitmap format is generated by RIP processing the PDL data. Next, the bitmap format image data is transferred to the printing unit 26 together with the print sheet configuration information table G (MFP-B). The printing unit 26 prints the image based on the image data on the specified sheet after laying out the image data in accordance with the instruction of the creep amount added to the print sheet configuration information table G (MFP-B).

The sheets printed by the color MFP 1 are inserted between the printed sheets currently output from the monochromatic MFP 2 that has been executing printing process (S17). The booklet making process is then executed (S18). Upon completing the bookmaking process, the monochromatic MFP 2 transmits the printing completion notification to the printing terminal 3 (S19), and the process is terminated.

As can be seen from the above, the booklet printing process for a plurality of sheets that constitute a booklet is executed by distributing the task among the two MFPs 1 and 2 in the printing process system of the present embodiment. In doing so, the creep amounts are calculated for MFPs 1 and 2 respectively based on both the print sheet configuration information table G and the insertion sheet information table I in such a way that the creep amounts are properly set up between the two MFPs 1 and 2. In other words, the creep amounts are calculated for the MFPs 1 and 2 using the information of all the sheets constituting a booklet in such a way that the creep amounts are properly set up between the two MFPs 1 and 2, that share the task of executing the booklet printing.

The printing process system of the present embodiment thus configured can make a booklet with good appearance with the booklet printing using a plurality of MFPs 1 and 2 as appropriate creep amounts can be set up among the MFPs 1 and 2 that share the task of executing the booklet printing.

In the first and second embodiments described above, the sheet numbers of the sheets, on which images are printed by the two MFPs 1 and 2 respectively, are set up by the user's operation using the booklet printing setting screen 50 for the MFPs 1 and 2 that share the task of executing the booklet printing. However, the sheet numbers of the sheets, on which images are printed by the MFPs 1 and 2 respectively, can be automatically set up based on the contents of the print document.

Figure 13:
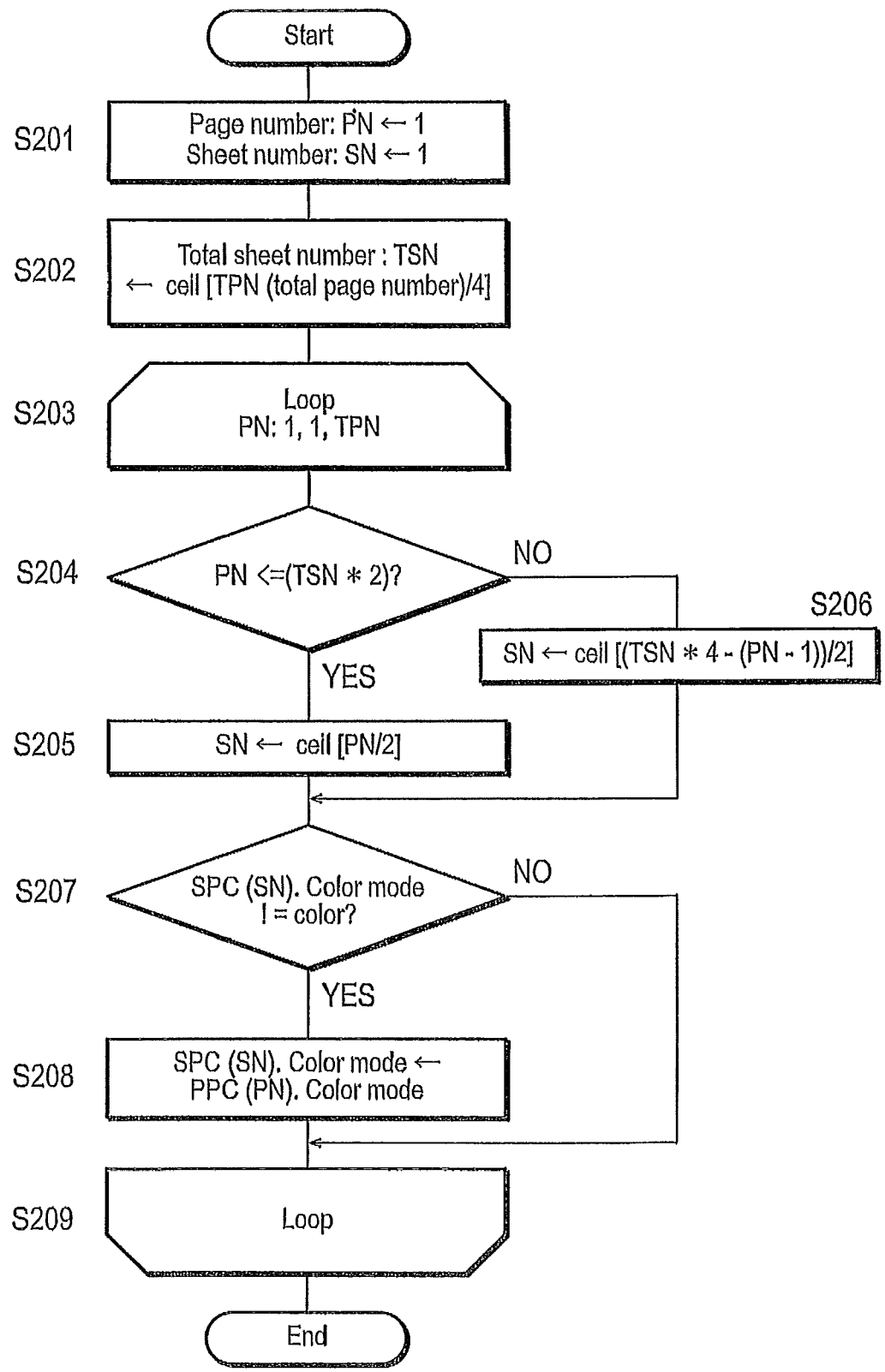
FIG. 13 is a flowchart for describing the process of selecting the output printer by the printing terminal shown in FIG. 1.

FIG. 13 is a flowchart for describing the process of selecting the output printer by the printing terminal shown in FIG. 1. In the output printer selection process shown in FIG. 13, an appropriate MFP is selected for each sheet on which images for four pages are laid out, based on the color/monochromatic information of each page and the total page number of the print document. The algorithm shown in the flowcharts of FIG. 13 is stored as a program in the ROM 32 of the printer terminal 3 and executed by the CPU 31.

As shown in FIG. 13, in the output printer selection process of the present embodiment, first, the page number PN and the sheet number SN are set to their initial values (step S201). In the present embodiment, the page number PN and the sheet number SN are set to the initial value "1".

Next, the total sheet number TSN is set up based on the total page number TPN of the print document (step S202). In the present embodiment, the total sheet number TSN is calculated by dividing the total page number TPN by four and rounding up the value after the decimal point. A color information per sheet SPC such as the one shown in FIG. 14(A) is generated based on the calculated total sheet number TSN (e.g., 4).

Next, the program moves to the loop process to be executed for each page (step S203). In the present embodiment, the process shown in steps S204 through S209 are repeated incrementing the page number PN by 1 starting from the initial value of "1" until the number reaches the total page number TPN (e.g., 16).

In the loop process, a judgment is made as to whether the current page number PN is less than twice the total sheet number TSN or not (step S204). If it is judged that the current page number PN is less than twice the total sheet number TSN (step S204: Yes), the sheet number SN of the sheet to which the current page number PN will be assigned is obtained by dividing the current page number PN by 2 and rounding up the values after the decimal point (step S205).

On the other hand, if it is judged that the current page number PN is not less than twice the total sheet number TSN (step S204: No), the sheet number SN of the sheet to which the current page number PN will be assigned is obtained by dividing the value, which is obtained by subtracting the current page number PN and 1 from the four times of the total sheet number TSN, by 2 and rounding up the values after the decimal point (step S206).

As can be seen from the above, the sheet number of the sheet to which images for four pages of the print document will be assigned is obtained according to the process shown in steps S204 through S206. For example, in case of a print document consisting of a total of 16 pages, pages 1, 2, 15, and 16, pages 3, 4, 13, and 14, pages 5, 6, 11, and 12, as well as pages 7 through 10 are each laid out on the same sheet.

Next, a judgment is made as to whether the color mode of the sheet of the current sheet number SN is "color" or not (step S207). In the present embodiment, a judgment is made as to whether the color mode of the sheet of the current sheet number SN is "color" or not by referring to the color information per sheet SPC shown in FIG. 14(A). In the initial state, the color modes of all the sheets are assigned to "monochromatic".

If it is judged that the color mode of the sheet of the current sheet number SN is "color" (step S207: No), the program moves to the process of step S209. Thus the color mode of the sheet of the current sheet number SN remains in "color".

On the other hand, if it is judged that the color mode of the sheet of the current sheet number SN is not "color" (step S207: Yes), the color mode of the sheet of the current sheet number SN is set to the color mode of the page corresponding to the current page number PN (step S208). In the present embodiment, for example, the color mode of the sheet of the current sheet number SN is set to the color mode of the page of the current page number PN obtained by referring to the color information per page PPC shown in FIG. 14(B). In other words, if the color mode of the current page number PN is "color", the color mode of the current sheet number SN, which has been "monochromatic", is set to "color". Alternatively, if the color mode of the current page number PN is "monochromatic", the color mode of the sheet of the current sheet number SN, which has been "monochromatic", stays as "monochromatic".

As the process shown in steps S203 through S209 is repeated until the number reaches the total page number TPN, the color mode of the sheets, to which the pages containing color images are assigned, is changed from "monochromatic" to "color". For example, if the images of the fifth page of the print document include color images, the color mode of the third sheet, to which the 5th page is assigned, is set to "color". A color MFP is selected for a sheet, for which the color mode is set to be "color", while a monochromatic MFP is selected for a sheet, for which the color mode is set to be "monochromatic".

As can be seen from the above, a suitable MFP is selected for printing each sheet based on the contents of the print document according to the process of the flowchart shown in FIG. 13. This makes it possible to automatically set up the sheet numbers of the sheets on which images are printed by each one of the MFPs 1 and 2. Such a configuration can eliminate setting errors that may be introduced by the user's direct setting of the sheet numbers and can also improve the productivity.

The invention is not limited to the embodiment described above, but also can be changed in various ways within the scope of the claims.

For example, booklet printing is executed using color and monochromatic MFPs from the standpoint of minimizing the cost in the above-mentioned embodiments. However, booklet printing can be done using a plurality of monochromatic MFPs for the purpose of shortening the printing time as well.

Moreover, although an MFP containing a printing control apparatus is used as the printing device in the first and second embodiments described above, the present invention is not limited to it, so other printing devices such as a copying machine or a printer can be used as well. Also, a printing control apparatus independent of a printing device can be used.

The units and method of conducting various processes in the printing process system according to the present invention can be realized by means of a dedicated hardware circuit, or a programmed computer. Said program can be provided either by a computer readable recording medium such as a flexible disk and a CD-ROM, or by being supplied on-line via a network such as the Internet. In this case, the program recorded on the computer readable recording medium is ordinarily transferred to and stored in a memory unit such as a hard disk. Said program can also be provided as independent application software or can be built into the software of the apparatus as a part of its function.

What is claimed is:

1. A printing process system for laying out and printing images for every two pages on one side of each sheet of paper for the purpose of creating a booklet of a pile of sheets stitched in the middle, comprising:
a generating unit for generating, in order to cause a plurality of printing devices to print the images on the sheets to form a booklet, print sheet data and insertion sheet data intended for each of the printing devices, said print sheet data showing information concerning the sheets for printing images using one of the printing devices, said insertion sheet data showing information concerning the sheets for printing images using the rest of the printing devices;
a calculating unit for calculating a shift amount for shifting the position of the image relative to the sheet, from a reference position, for each of the sheets referenced in said print sheet data, based on said print sheet data and said insertion sheet data generated by said generating unit, said shift amount ensuring that the image gets away from the edge of the sheet to be closer to its center as the sheet gets away from the outermost of the booklet to be closer to its innermost; and
an instructing unit for instructing a relevant printing device to print the images on said sheets referenced in said print sheet data, based on said shift amount calculated by said calculating unit.

2. The printing process system as claimed in claim 1, wherein
said print sheet data and said insertion sheet data include the sheet number that indicates the serial number of the particular sheet referenced in the relevant data according to the orders starting from the outermost sheet of said booklet, and
said calculating unit calculates said shift amounts for the sheets referenced in said print sheet data, by calculating said shift amounts for all the sheets referenced in said print sheet data and said insertion sheet data sequentially according to the order starting from the smallest sheet number.

3. The printing process system as claimed in claim 1, further comprising:
an acquiring unit for acquiring printing setting information in order to specify the sheets for printing images using each one of said printing devices, wherein
said generating unit generates said print sheet data and said insertion sheet data intended for each of said printing devices, from said printing setting information acquired by said acquiring unit.

4. The printing process system as claimed in claim 1, wherein
said generating unit is provided on a terminal apparatus that generates a print job containing said print sheet data and said insertion sheet data, and
said calculating unit and said instructing unit are provided on a printing control apparatus that executes said print job.

5. The printing process system as claimed in claim 1, wherein
said generating unit and said calculating unit are provided on a terminal apparatus that generates a print job containing said print sheet data with said shift amount added, and
said instructing unit is provided on a printing control apparatus that executes said print job.

6. The printing process system as claimed in claim 1, wherein
said printing devices include both a color printing device and a monochromatic printing device,
said print sheet data generated for said color printing device shows information concerning the sheets for printing color images, and
said print sheet data generated for said monochromatic printing device shows information concerning the sheets for printing monochromatic images alone.

7. A printing control apparatus for executing a print job for laying out and printing images for every two pages on one side of each sheet of paper for the purpose of creating a booklet of a pile of sheets stitched in the middle, comprising:
a receiving unit for receiving a print job, in order to cause a plurality of printing devices to print the images on the sheets to form a booklet, said print job containing print sheet data and insertion sheet data generated for a particular printing device of the printing devices, said print sheet data showing information concerning the sheets for printing images using said particular printing device, said insertion sheet data showing information concerning the sheets for printing images using the rest of the printing devices;
a calculating unit for calculating a shift amount for shifting the position of the image relative to the sheet, from a reference position, for each of the sheets referenced in said print sheet data, based on said print sheet data and said insertion sheet data which are contained in said print job received by said receiving unit, said shift amount ensuring that the image gets away from the edge of the sheet to be closer to its center as the sheet gets away from the outermost of the booklet to be closer to its innermost; and
an instructing unit for instructing said particular printing device to print the images on said sheets referenced in said print sheet data, based on said shift amount calculated by said calculating unit.

8. The printing control apparatus as claimed in claim 7, wherein
said print sheet data and said insertion sheet data include the sheet number that indicates the serial number of the particular sheet referenced in the relevant data according to the orders starting from the outermost sheet of said booklet, and
said calculating unit calculates said shift amounts for the sheets referenced in said print sheet data, by calculating said shift amounts for all the sheets referenced in said print sheet data and said insertion sheet data sequentially according to the order starting from the smallest sheet number.

9. The printing control apparatus as claimed in claim 7, wherein
said particular printing device is either a color printing device or a monochromatic printing device, wherein
if said particular printing device is a color printing device, said print sheet data shows information concerning the sheets for printing color images, and
if said particular printing device is a monochromatic printing device, said print sheet data shows information concerning the sheets for printing monochromatic images alone.

10. A terminal apparatus for generating a print job for laying out and printing images for every two pages on one side of each sheet of paper for the purpose of creating a booklet of a pile of sheets stitched in the middle, comprising:
a generating unit for generating, in order to cause a plurality of printing devices to print the images on the sheets to form a booklet, print sheet data and insertion sheet data intended for each of the printing devices, said print sheet data showing information concerning the sheets for printing images using one of the printing devices, said insertion sheet data showing information concerning the sheets for printing images using the rest of the printing devices;

a calculating unit for calculating a shift amount for shifting the position of the image relative to the sheet, from a reference position, for each of the sheets referenced in said print sheet data, based on said print sheet data and said insertion sheet data generated by said generating unit, said shift amount ensuring that the image gets away from the edge of the sheet to be closer to its center as the sheet gets away from the outermost of the booklet to be closer to its innermost; and a job generating unit for generating the print job containing said print sheet data with said shift amount calculated by said calculating unit added; and a transmitting unit for transmitting said print job generated by said job generating unit to a printing control apparatus that controls said plurality of printing devices.

11. The terminal apparatus as claimed in claim 10, wherein said print sheet data and said insertion sheet data include the sheet number that indicates the serial number of the particular sheet referenced in the relevant data according to the orders starting from the outermost sheet of said booklet, and said calculating unit calculates said shift amounts for the sheets referenced in said print sheet data, by calculating said shift amounts for all the sheets referenced in said print sheet data and said insertion sheet data sequentially according to the order starting from the smallest sheet number.

12. The terminal apparatus as claimed in claim 10, further comprising:

an acquiring unit for acquiring printing setting information in order to specify the sheets for printing images using each one of said printing devices, wherein said generating unit generates said print sheet data and said insertion sheet data intended for each of said printing devices, from said printing setting information acquired by said acquiring unit.

13. The terminal apparatus as claimed in claim 10, wherein said printing devices include both a color printing device and a monochromatic printing device, said print sheet data generated for said color printing device shows information concerning the sheets for printing color images, and said print sheet data generated for said monochromatic printing device shows information concerning the sheets for printing monochromatic images alone.

14. A printing process method for laying out and printing images for every two pages on one side of each sheet of paper for the purpose of creating a booklet of a pile of sheets stitched in the middle, comprising:

(a) in order to cause a plurality of printing devices to print the images on the sheets to form a booklet, generating print sheet data and insertion sheet data intended for a particular printing device of the printing devices, said print sheet data showing information concerning the sheets for printing images using said particular printing device, said insertion sheet data showing information concerning the sheets for printing images using the rest of the printing devices;

(b) calculating a shift amount for shifting the position of the image relative to the sheet, from a reference position, for each of the sheets referenced in said print sheet data, based on said print sheet data and said insertion sheet data generated in said step (a), said shift amount ensuring that the image gets away from the edge of the sheet to be closer to its center as the sheet gets away from the outermost of the booklet to be closer to its innermost; and (c) instructing said particular printing device to print the images on said sheets referenced in said print sheet data, based on said shift amount calculated in said step (b).

15. The printing process method as claimed in claim 14, wherein said print sheet data and said insertion sheet data include the sheet number that indicates the serial number of the particular sheet referenced in the relevant data according to the orders starting from the outermost sheet of said booklet, and said shift amounts for the sheets referenced in said print sheet data, are calculated by calculating said shift amounts for all the sheets referenced in said print sheet data and said insertion sheet data sequentially according to the order starting from the smallest sheet number in said step (b).

16. The printing process method as claimed in claim 14, further comprising:

(d) acquiring printing setting information in order to specify the sheets for printing images using each one of said printing devices, wherein said print sheet data and said insertion sheet data are generated from said printing setting information acquired in said step (d) intended for said particular printing device in said step (a).

17. The printing process method as claimed in claim 14, wherein said particular printing device is either a color printing device or a monochromatic printing device, wherein if said particular printing device is a color printing device, said print sheet data shows information concerning the sheets for printing color images, and if said particular printing device is a monochromatic printing device, said print sheet data shows information concerning the sheets for printing monochromatic images alone.

* * * * *